UNITED STATES PATENT OFFICE.

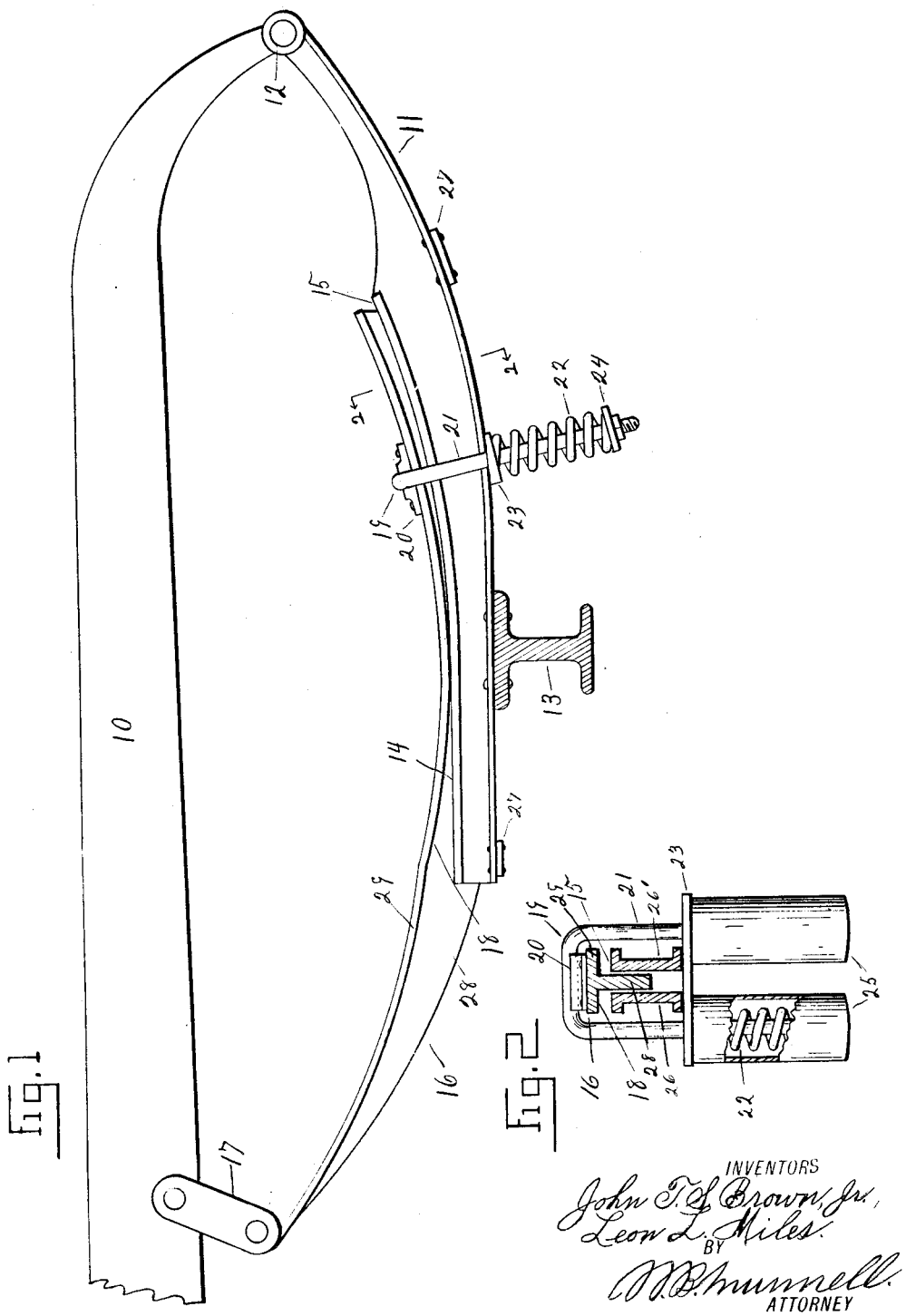

JOHN T. S. BROWN, JR., OF PROSPECT, AND LEON L. MILES, OF LOUISVILLE, KENTUCKY.

SPRING SUSPENSION FOR VEHICLES.

1,182,141.  Specification of Letters Patent.  Patented May 9, 1916.

Application filed September 13, 1915. Serial No. 50,410.

*To all whom it may concern:*

Be it known that we, JOHN T. S. BROWN, Jr., and LEON L. MILES, citizens of the United States, and residents, respectively, of Prospect and of the city of Louisville, both in the county of Jefferson and State of Kentucky, have invented certain new and useful Improvements in Spring Suspension for Vehicles, of which the following is a specification.

This invention relates to spring suspension for vehicles, being more especially applicable to motor driven vehicles.

In vehicle construction the power of the springs are substantially constant factors, while the load imposed is a varying factor, consequently springs are designed to display their maximum efficiency when carrying an average load, the result being that with less than the average load the springs are stiff and do not respond promptly, with more than the average load the springs are compressed to such a degree that they can not recover properly, the result in case of pleasure vehicles being discomfort to the occupants if more or less than the calculated complement of passengers is carried.

An object of this invention is the provision of means whereby the stress of the load is transmitted to the springs in such a manner that they act with substantially their full efficiency regardless of the load imposed.

A further object is the provision of means whereby the suspension springs serve to check the rebound as well as carry the load.

With the foregoing and other objects in view the invention consists of the novel construction and arrangement of parts illustrated in the accompanying drawing which forms a part of this specification, wherein is set forth an embodiment of the invention, but it is to be understood that such changes and modifications may be resorted to as come within the scope of the claims appended hereunto.

Referring to the drawing wherein similar reference characters designate like parts in the different views Figure 1 is a side elevation of an embodiment of the invention; Fig. 2, a section on line 2—2 of Fig. 1.

Referring more particularly to the drawing the reference numeral —10— designates the forward portion of the frame, or chassis, of a motor car. An arm —11— pivotally connected at one end with the frame as at —12—, and secured intermediate its length to an axle —13—, of the vehicle, serves to maintain the relationship of the axle and the vehicle. This arm may be of any desirable shape compatible with its function, but a preferred form is that in which it simulates the appearance of an elliptic spring. The upper side —14— of this arm is a plane surface from a point over the axle to its rear, or free, end and is tangent to a curved portion —15—. The plane surface acts as a platform, or bearing, upon which bears a second member, or arm —16—, which is pivotally connected with the chassis, by suitable means such as a link —17—, at a point removed from the point where the arm 11 is connected. The arm or lever 16 extends longitudinally and rests on the arm 11, the lower, or contacting, surface —18— being contoured so that it contacts with the arm 11 at but one point and has a rocking, or rolling movement thereon, whereby the point of contact varies as the members approach or recede, from each other. The normal point of contact of the arms is proximate the stationary tangent. At a suitable distance forward from the normal point of contact, resilient means are positioned which are adapted to yieldingly oppose relative vertical movement of the arms. As illustrated this means comprises a shackle —19— which rests in a bearing —20— transversely disposed on the upper surface of the arm 16. The legs —21— of the shackle depend on each side of the arms and a coiled compression spring —22— is disposed about each leg. These springs bear respectively on a transverse bar —23—, which rests against the under side of the arm 11, and on washers —24— at the lower ends of the legs. The springs may be provided with dust covers as —25— (see Fig. 2).

The arm 11 is composed of two channel shaped members —26—26'— held in spaced parallel relationship, with their plane surfaces in opposition, by transverse plates —27—. The arm 16 is substantially T shaped in cross section, the stem —28— thereof depending within the central channel of the arm 11, while the flange —29— rocks on the upper edges of the members 26—26'. This construction serves to prevent lateral displacement of the members 11 and 16.

In the arrangement depicted the arm 16 is a lever of the first class, the fulcrumage of which shifts toward the rear, or power end as the same is depressed, by an increase in the load. As the rear end of the arm is depressed the forward end rises and through the medium of the shackle compresses the spring, the resistance of which is substantially constant. The curvature of the lever is so designed that the fulcrum point shifts in direct ratio with the load and thus equilibrium is maintained between the load and the spring. Should the rear end of the arm 10 recede from the arm 11 above, or beyond, the normal point owing to a rebound, due to inequalities in the roadway, or other cause, the forward portion will roll upon the curved portion 15 of the arm 11 and the lever 16 now acting as a lever of the second class will compress the spring, which owing to the increasing leverage will act with a force in proportion to the extent of the rebound to restore the members to normal position.

Having thus described our invention so that anyone skilled in the art pertaining thereto may make and use the same, we claim:

1. In a spring suspension device for vehicles, a chassis, a member pivotally connected at one end with said chassis and attached intermediate its length to an axle of the vehicle, a second member pivotally connected with the chassis at a point removed from the first mentioned connection and bearing upon the first named member, and means adapted to yieldingly oppose relative movement in either direction from a normal position of rest of said members.

2. In a spring suspension device for vehicles, a chassis, a member pivotally connected at one end with said chassis and attached intermediate its length to an axle of the vehicle, a second member pivotally connected with the chassis at a point removed from the first mentioned connection, said second member extending longitudinally of and bearing on the first named member, and means adapted to yieldingly oppose relative movement of said members in either direction from a normal position.

3. In a spring suspension device for vehicles, a chassis, a member pivotally connected at one end with said chassis and attached intermediate its length to an axle of the vehicle, a second member pivotally connected with said chassis at a point removed from the first mentioned connection, said second member extending longitudinally of and bearing on the first named member, means to prevent relative lateral movement of said members, and means adapted to yieldingly oppose relative vertical movement of said members in either direction from a normal position.

4. In a spring suspension device for vehicles, a chassis, a rigid member pivotally connected at one end with said chassis and attached intermediate its length to an axle of the vehicle, a second rigid member pivotally connected with the chassis at a point removed from the first mentioned connection, and having a rocking point of contact upon the first named member, and a spring connected with said members and adapted to oppose relative vertical movement thereof in either direction from a normal position of rest.

5. In a spring suspension device for vehicles, a chassis, a rigid member pivotally connected at one end with said chassis and attached intermediate its length to an axle of the vehicle, a second rigid member pivotally connected with the chassis at a point removed from the first mentioned connection, said second member extending longitudinally of and having a rocking point of contact on the first named member and a spring adapted to oppose relative vertical movement of said members in either direction from a normal position of rest.

6. In a spring suspension device for vehicles, a chassis, a rigid member pivotally connected at one end with said chassis and attached intermediate its length to an axle of the vehicle, a second rigid member pivotally connected with the chassis at a point removed from the first mentioned connection, said second member extending longitudinally of and having a rocking point of contact on the first named member, means to prevent relative lateral movement of said members, and a spring adapted to oppose relative vertical movement of said members in either direction from a normal position.

7. In a spring suspension device for vehicles, a pair of members pivotally connected to the vehicle and disposed in longitudinal relationship, one of said members attached to an axle of the vehicle, the other member adapted to rock upon the first mentioned member, a spring, and means whereby said second named member acts in one position as a lever of the first order upon said spring and in another position as a lever of second order, said positions being determined by the load.

8. In a spring suspension device for vehicles, an axle, means for maintaining the relationship of the vehicle and said axle, a lever pivotally connected by one end to the vehicle and fulcrumed on the axle, means whereby the fulcrum point varies with the load on the vehicle and a spring opposing the movement of the fulcrum point in either direction from a normal state of rest.

9. In a spring suspension device for vehicles, a chassis, a member pivotally connected at one end with said chassis and attached intermediate its length to an axle of the vehicle, a second member pivotally connected with the chassis at a point removed from the first mentioned connection, said second member extending longitudinally of and bearing on the first named member, the bearing surface of the first named member being a plane surface with an acclivity at the forward end thereof, the second named member presenting a convex bearing surface which rocks on said plane surface or acclivity accordingly as the chassis descends below or rises above a normal position of rest, and a tension device tending to restrain the movement of the second member in either direction from its normal position of rest.

10. In a spring suspension device for vehicles, a chassis, a member pivotally connected at one end with the chassis and attached intermediate its length to an axle of the vehicle, a second member pivotally connected with the chassis at a point removed from the first mentioned connection, said second member extending longitudinally of and bearing on the first named member, the bearing surface in the first named member being a plane surface with an acclivity at the forward end thereof, the second named member presenting a convex bearing surface which rocks on said plane surface or acclivity accordingly as the chassis descends below or rises above a normal position of rest, and resilient means opposing the movement of the second member along the plane surface or the acclivity.

11. In a spring suspension device for vehicles, a pair of members pivotally connected to the vehicle and disposed in longitudinal relationship, one of said members presenting a bearing face comprising a plane with a rising curve at one end thereof, the other member presenting a convex bearing surface which contacts normally with the first named member in proximity to its stationary tangent, and a spring connected with said members and adapted to oppose movement of the second member in either direction from its normal point of contact.

12. In a spring suspension device for vehicles, an axle, a platform supported by said axle, the bearing face of the platform being a plane with an upward curve at the forward end thereof, a lever, pivotally connected by one end to the vehicle, which has a convex bearing surface bearing on the platform and adapted to rock on said plane or curve in conformity with the movement of the vehicle below or above its normal position of rest, and a tension device tending to restrain the movement of the second member in either direction from its normal position of rest.

13. In a spring suspension device for vehicles, an axle, a platform supported by said axle, the bearing surface of the platform being a plane with an upward curve at the forward end thereof, a lever, pivotally connected by one end to the vehicle, and having a convex bearing surface bearing on the platform and adapted to rock on said plane, or curve in conformity with the movement of the vehicle below or above its normal position of rest, and resilient means adapted to oppose the rocking of said lever in either direction from its normal point of contact.

14. In a spring suspension device for vehicles, a rocking lever, a spring, a connection between said spring and lever, a track on which said lever rocks, said track so contoured that while moving along one portion thereof said lever acts on said spring as a lever of the first order and when moving along the other portion thereof it acts as a lever of the second order.

JOHN T. S. BROWN, Jr.
LEON L. MILES.